July 11, 1933.  R. T. GILLETTE  1,918,028
WELDING ELECTRODE
Filed Aug. 10, 1932   2 Sheets-Sheet 1
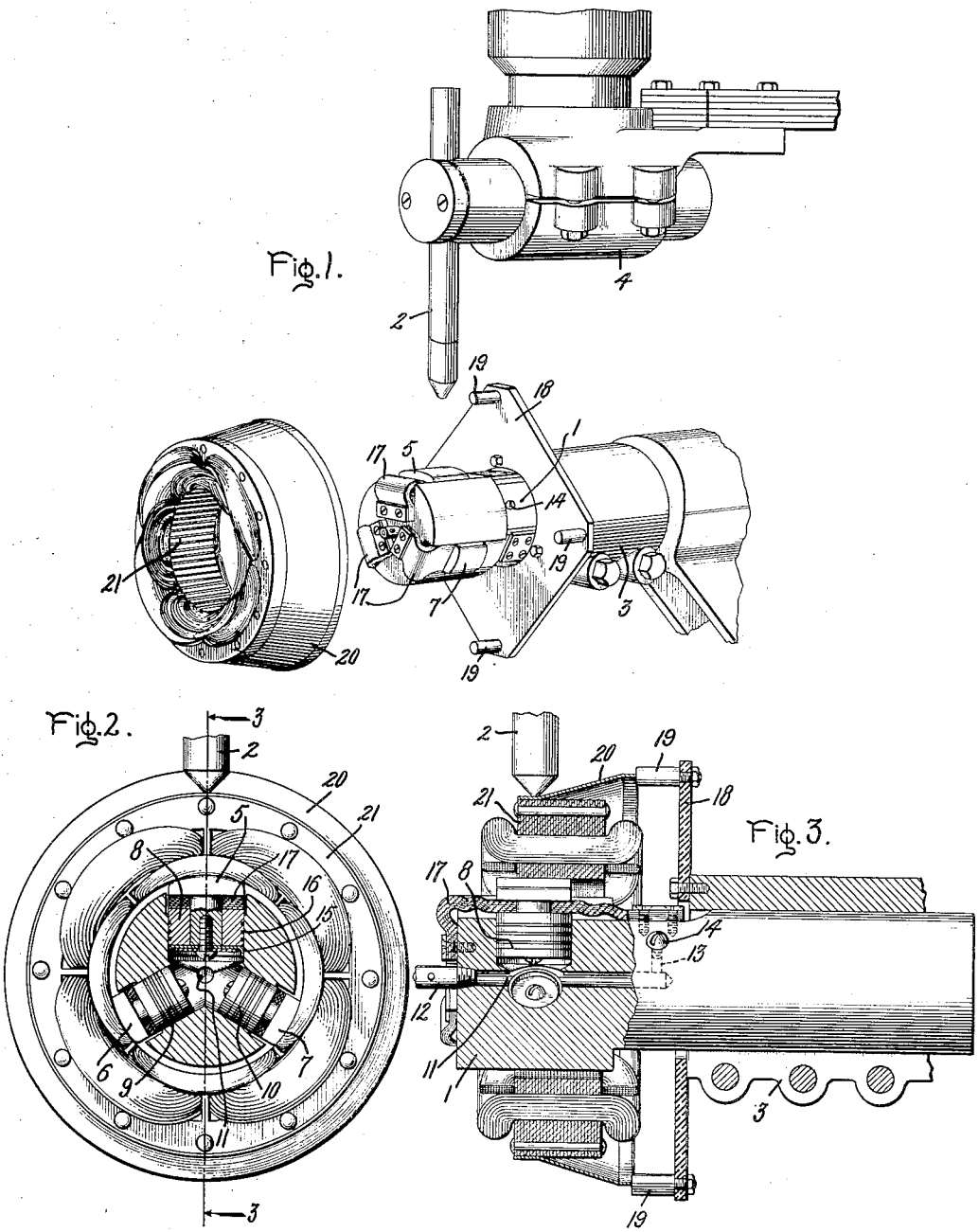
Inventor:
Robert T. Gillette,
by Chas. T. Mullen
His Attorney.

July 11, 1933.  R. T. GILLETTE  1,918,028
WELDING ELECTRODE
Filed Aug. 10, 1932    2 Sheets-Sheet 2
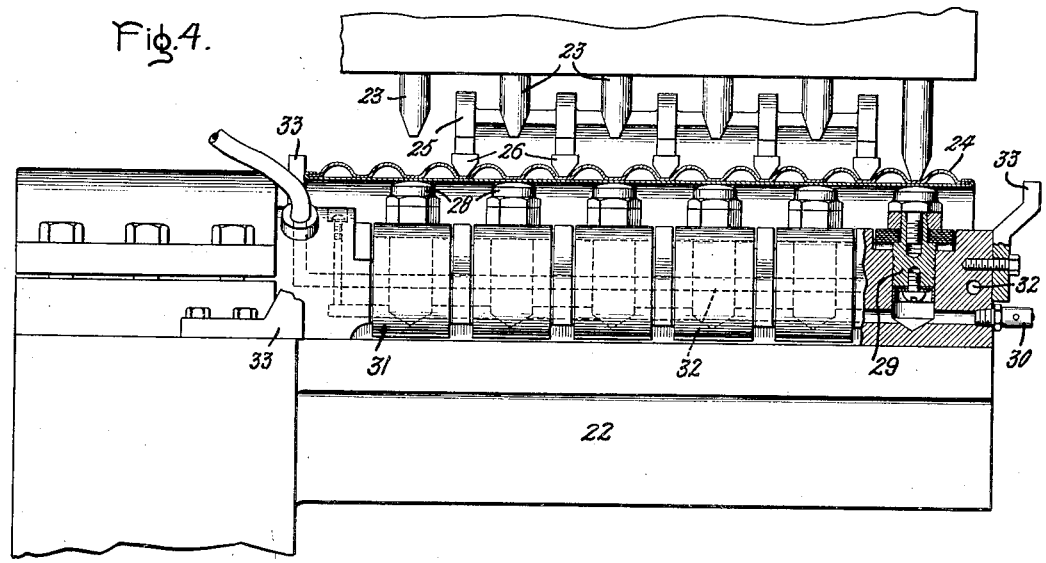
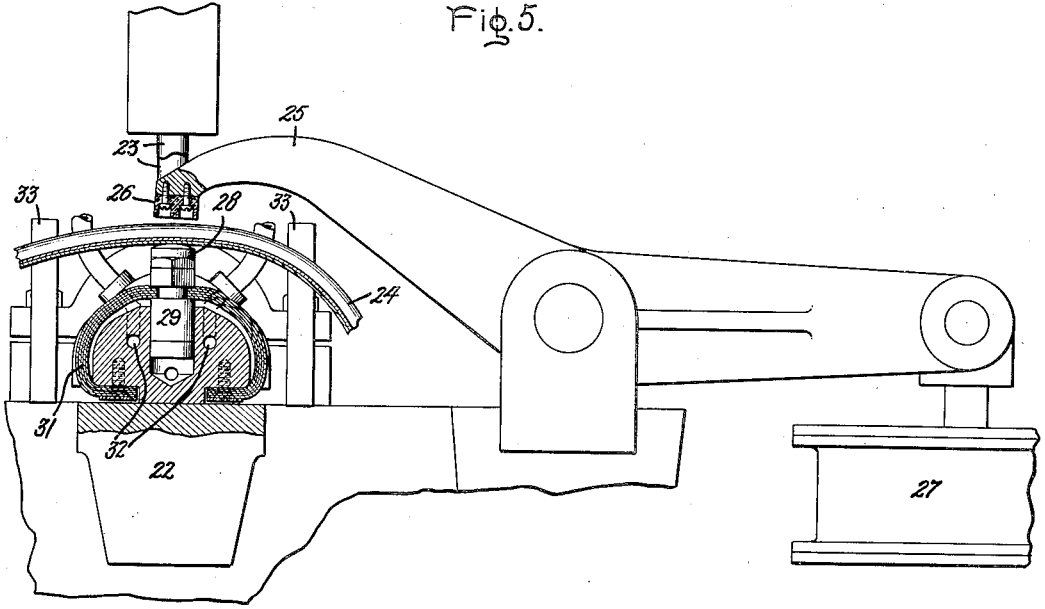
Inventor:
Robert T. Gilette,
by Charles V. Muela
His Attorney.

Patented July 11, 1933

1,918,028

UNITED STATES PATENT OFFICE

ROBERT T. GILLETTE, OF SCOTIA, NEW YORK, ASSIGNOR TO GENERAL ELECTRIC COMPANY, A CORPORATION OF NEW YORK

WELDING ELECTRODE

Application filed August 10, 1932. Serial No. 628,169.

My invention relates to resistance welding machines, and particularly to electrodes of improved construction for such machines.

The various features of novelty which characterize my invention will be pointed out with particularity in the claims annexed to and forming part of this specification.

For a better understanding of my invention reference may be had to the following description taken in connection with the accompanying drawings, in which Fig. 1 is a perspective view of a portion of a machine of which my improved electrode forms a part, Figs. 2 and 3 are side and end views, partly in section, illustrating the construction of the electrode shown in Fig. 1 and the manner in which it cooperates with the work during welding, and Figs. 4 and 5 are side and end views, partly in section, of a portion of a welding machine embodying a second form of my invention.

In each of the embodiments illustrated, during the welding operation the electrodes firmly clamp the work in engagement therewith and prevent burning of its surface by the flow of welding current therethrough.

The embodiment shown in Figs. 1, 2 and 3 constitutes a self-releasing clamp which holds the work firmly in position thereon only during the welding operation. In these figures my improved electrode is illustrated at 1 with an electrode 2 of usual construction with which it cooperates. Electrode 1 is supported in a clamp 3 and electrode 2 in a clamp 4 of a spot welding machine, a portion only of which is illustrated in the drawings.

Electrode 1 comprises a plurality of work engaging members 5, 6 and 7 which are radially supported in the end of the welding electrode which protrudes from the clamp in which it is inserted. These work engaging members are supported on plungers 8, 9 and 10 inserted in cylinders forming part of a fluid chamber 11 located in the end of the electrode. In the particular arrangement illustrated this fluid chamber is formed by the intersection of the cylinders for the plungers 8, 9 and 10. A fluid substance, for example, a heavy oil may be supplied to this chamber through a check valve fitting 12 by means of a grease gun, or similar device, adapted to cooperate therewith. A vent opening 13 normally closed by a screw 14 may be provided for facilitating the application of fluid to the chamber.

The work engaging members 5, 6 and 7 are attached to the plungers 8, 9 and 10 by means of screws which also serve to clamp leather washer 15 on the inner end of the plungers to obtain thereby a tight joint between the plungers and the cylinders into which they are inserted. The plungers may also be provided with rings 16 for preventing the leakage of fluid from chamber 11. Each of the work engaging members is electrically connected by a flexible conductor 17 to the body of the electrode. The various parts of the electrode are preferably formed of copper, or some similar material having high electrical conductivity. The electrode 2 may be tipped and the work engaging members 5, 6 and 7 may be made of, or surfaced with, a wear resisting material such as disclosed in my Patent No. 1,539,810, granted May 26, 1925.

To facilitate the welding operation about to be described the lower clamp 3 of the welding machine may be provided with a work guide comprising a disk 18 of insulating material and a plurality of work engaging members 19 supported thereon which are adapted to engage and position one of the work parts relative to another which is supported on the electrode during the welding operation.

The embodiment of my invention illustrated in Figs. 1, 2 and 3 will be better understood from a consideration of its operation. It is particularly adapted for welding tubular parts such, for example, as a bumper ring 20 to the stator element 21 of a motor. The bumper ring is initially assembled on the motor element, as illustrated in Fig. 1 of the drawings, and the parts then inserted on the electrode, as illustrated in Figs. 2 and 3. The bumper ring is held in proper position in the machine by means of pins 19, and the motor element is supported on the electrode by the work engaging elements 5, 6 and 7 thereof which have a surface configuration conforming to the inside surface of the motor element. As will be noted from a consideration of Fig. 2, plunger 8 is larger than plungers 9 and 10. Preferably plunger 8 has an area slightly greater than the combined areas of the remaining plungers. With the parts assembled in the position shown in Figs. 2 and 3, when pressure and current are supplied to the work parts 20, 21 through electrode 2, plunger 8 is depressed and plungers 9 and 10 are extended into clamping engagement with the interior of the work part 21 through the agency of the backing-up fluid in chamber 11. By making the area of plunger 8 greater than the areas of the remaining plungers they are extended an amount greater than the depression of plunger 8, and all of these plungers are quickly brought into firm engagement with the work. The engagement thus established clamps the work firmly in position and facilitates the conduction of welding current thereto. When the welding pressure is released, the clamping action is likewise interrupted and the work parts may be readily removed from the electrode.

The self-releasing nature of the electrode clamp and the firm engagement it makes with the work during the welding operation admirably adapt it for welding operations which are performed in rapid succession on a great number of parts of like shape and configuration for which the electrode is particularly adapted. The firm engagement between the work engaging elements of the electrode clamp and the work prevents surface burning where the work comes in engagement with the electrode. It also prevents the work from moving relatively to the electrode during the welding operation.

Figs. 4 and 5 illustrate another embodiment of my invention as applied to a spot welding machine of which it forms the lower electrode 22 which cooperates with a plurality of upper electrodes 23. The work 24 is held on the lower electrode by a clamp 25, the fingers 26 of which are forced into engagement therewith by pressure applied thereto by air cylinder 27. The fingers 26 of the work clamp engage the work at points intermediate electrodes 23.

The lower electrode 22 comprises a plurality of work engaging members 28 which are located immediately beneath electrodes 23 and supported for movement toward and away therefrom. Each member is supported on a plunger 29 which projects into a chamber to which fluid may be supplied through a fitting 30. Each member 28 is connected by flexible conducts 31 to one terminal of a suitable source of welding current, the other terminal of which is connected to electrodes 23. The lower electrode may be cooled by the circulation of a cooling medium through passages 32 therein. Guides 33 may also be provided for locating the work relative to the work engaging plungers 28 of electrode 22.

The welding operation is performed by moving electrodes 23 into engagement with the work one at a time. When one of these electrodes engages the work the pressure applied thereby is transmitted to the plunger 29 immediately below it which is slightly depressed and transmits to the other plungers the pressure applied to it. This causes each of the work engaging members 28 supported on these plungers to make a firm engagement with the work during welding. Thus irrespective of surface irregularities in the work or insufficient clamping prior to welding to bring the work into engagement with the electrode throughout its length, the welding operation may be performed without danger of burning the surface of the work when using an electrode of my improved construction.

Although in the arrangement illustrated in Figs. 1, 2 and 3, the electrode is adapted for holding tubular articles, it is to be understood that it may be adapted for holding non-tubular objects. Electrodes according to my invention may also be employed in line welding machines and other forms of resistance welding apparatus. The arrangement of the work engaging members for movement toward and away from one another or the work by means of which a depression of one of the members operates to extend the remaining members into clamping engagement with the work may be modified in many ways without departing from my invention.

What I claim as new and desire to secure by Letters Patent of the United States, is:

1. Welding apparatus comprising an electrode having a plurality of work engaging members, a cooperating electrode located opposite one of said members, and means responsive to the depression of said member by pressure applied thereto through the work by said cooperating electrode for extending the remaining members of said first mentioned electrode into firm engagement with the work.

2. Welding apparatus comprising means having a plurality of relatively movable members for engaging one of the exterior surfaces of an assembly of parts to be welded, means for engaging the other exterior surface of said parts at a point substantially opposite one of said members, means for supplying welding current and pressure to said work engaging means, and means responsive to the depression of one of said members for extending the remaining members of said first mentioned means into firm engagement with the parts to be welded.

3. Welding apparatus comprising an electrode having a plurality of work engaging members, means for clamping the work to be welded on said electrode, a cooperating electrode, means for moving said cooperating electrode into engagement with the work inserted between it and said first mentioned electrode at points opposite said work engaging members of said first mentioned electrode, and means responsive to the depression of one of said work engaging members for extending the remaining members into firm engagement with the work.

4. Welding apparatus comprising an electrode having a plurality of work engaging members, a plurality of cooperating electrodes each one of which is oppositely disposed to one of said work engaging members, means for applying said cooperating electrodes one at a time to work inserted between them and said first mentioned electrode, and means responsive to the depression of a member in said first mentioned electrode by pressure applied thereto through the work by one of said cooperating electrodes for extending the remaining members thereof into firm engagement with the work.

5. A welding electrode comprising a plurality of work engaging members, means for supporting said members for movement toward and away from one another, and means responsive to the depression of one of said members for extending the remaining members into clamping engagement with the work supported by said electrode.

6. A welding electrode comprising a plurality of plungers, means for supporting said plungers for movement toward and away from one another, a fluid chamber in said supporting means into which each of said plungers projects, and means for connecting said plungers to a source of welding current.

7. A welding electrode comprising a supporting member, a plurality of radially disposed plungers in said member, a fluid chamber in said member into which each of said plungers projects, and means for electrically connecting each of said plungers to said member.

8. A welding electrode comprising a plurality of plungers, one of which is adapted to be depressed by pressure applied thereto by a cooperating electrode and has a cross-sectional area greater than the combined cross-sectional areas of the remaining plungers, means for supporting said plungers for movement toward and away from one another, means in said supporting means for supplying a single source of fluid pressure to each of said plungers, and means for electrically connecting said plungers to a source of welding current.

9. Welding apparatus comprising an electrode having a plurality of plungers one of which has a cross-sectional area greater than the combined cross-sectional areas of the remaining plungers, a cooperating electrode located opposite said plunger of large cross-sectional area, means for supporting said plungers for movement toward and away from one another, means in said supporting means for supplying a single source of fluid pressure to each of said plungers, and means for electrically connecting each of said plungers to one terminal of a source of welding current and said cooperating electrode to the other terminal of said source.

In witness whereof, I have hereunto set my hand.

ROBERT T. GILLETTE.